(12) United States Patent
Li et al.

(10) Patent No.: US 11,630,723 B2
(45) Date of Patent: Apr. 18, 2023

(54) PROTECTED DATA STREAMING BETWEEN MEMORIES

(71) Applicant: QUALCOMM INCORPORATED, San Diego, CA (US)

(72) Inventors: Yanru Li, San Diego, CA (US); Dexter Tamio Chun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 17/147,110

(22) Filed: Jan. 12, 2021

(65) Prior Publication Data
US 2022/0222137 A1    Jul. 14, 2022

(51) Int. Cl.
*H04L 9/08* (2006.01)
*G06F 11/10* (2006.01)
*G06F 16/907* (2019.01)

(52) U.S. Cl.
CPC ...... *G06F 11/1044* (2013.01); *G06F 11/1068* (2013.01); *G06F 11/1096* (2013.01); *G06F 16/907* (2019.01)

(58) Field of Classification Search
CPC ............. G06F 11/1044; G06F 11/1068; G06F 11/1096; G06F 16/907; G06F 13/1657; G06F 21/79; G06F 13/1694; H04L 9/0822; H04L 9/0877; H04L 2209/34; G11C 2029/0411
USPC ....................................................... 714/764
See application file for complete search history.

(56) References Cited

U.S. PATENT DOCUMENTS

| | | | | |
|---|---|---|---|---|
| 7,545,928 | B1 * | 6/2009 | Goh ...................... | H04L 9/0625 713/172 |
| 8,239,732 | B2 * | 8/2012 | Tan ...................... | G06F 11/1052 714/763 |
| 10,645,337 | B1 | 5/2020 | Mullins et al. | |
| 2003/0163649 | A1 * | 8/2003 | Kapur .................. | G06F 12/0862 711/146 |
| 2005/0278549 | A1 * | 12/2005 | Torla ...................... | G06F 21/72 713/189 |
| 2008/0025503 | A1 | 1/2008 | Choi et al. | |
| 2015/0301890 | A1 * | 10/2015 | Marshall ............. | G06F 11/1048 714/764 |

(Continued)

FOREIGN PATENT DOCUMENTS

| | | | | |
|---|---|---|---|---|
| JP | 6450775 B2 * | 1/2019 | ......... | G06F 12/1036 |
| WO | 2015178987 A2 | 11/2015 | | |

OTHER PUBLICATIONS

International Search Report and Written Opinion—PCT/US2021/061457—ISA/EPO—dated Feb. 25, 2022.

*Primary Examiner* — Albert Decady
*Assistant Examiner* — Enam Ahmed
(74) *Attorney, Agent, or Firm* — Smith Tempel Blaha LLC/Qualcomm

(57) ABSTRACT

Transferring data between memories may include reading data associated with a memory transfer transaction from a first memory, determining whether a bypass indication associated with the memory transfer transaction is asserted, and transferring the data from the first memory to a second memory. The transferring may include bypassing the first-processing if the bypass indication is asserted. The transferring may further include bypassing second-processing the data if the bypass indication is asserted. Following bypassing the second-processing, the data may be stored in the second memory.

29 Claims, 8 Drawing Sheets

(56) References Cited

U.S. PATENT DOCUMENTS

| | | | |
|---|---|---|---|
| 2016/0055058 A1* | 2/2016 | Zheng | G06F 11/10 |
| | | | 714/764 |
| 2016/0055059 A1* | 2/2016 | Hu | G06F 11/1008 |
| | | | 714/764 |
| 2020/0127980 A1 | 4/2020 | Smith et al. | |

* cited by examiner

PROTECTED DATA STREAMING BETWEEN MEMORIES

DESCRIPTION OF THE RELATED ART

Portable computing devices ("PCDs") are becoming necessities for people on personal and professional levels. These devices may include cellular telephones, tablet computers, palmtop computers, portable digital assistants ("PDAs"), portable game consoles, and other portable electronic devices. PCDs commonly contain integrated circuits or systems-on-a-chip ("SoCs") that include numerous components designed to work together to deliver functionality to a user. For example, an SoC may contain any number of processing engines, such as central processing units ("CPUs") with multiple cores, graphical processing units ("GPUs"), neural processing units ("NPU"s), digital signal processors ("DSP"s), wireless transceiver units (also referred to as modems), etc. An SoC may be coupled to other components within a PCD or other computing device, such as another SoC, memory chips, etc.

There are use cases or operational scenarios in which data may be streamed or transferred from one memory to another. Data may be transferred between two memories in the same system (e.g., same SoC) or from a memory in one system to a memory in another system (e.g., different SoCs). A processing engine, such as a CPU, a direct memory access ("DMA") controller, a memory accelerator, etc., may control aspects of transferring data between memories.

Data stored in a memory may be protected. Encryption is an example of a type of data protection. Error detection and correction using parity information (e.g., error-correcting codes or "ECC") is another example of data protection. Authentication is yet another example of data protection. Other types of processing for data stored in a memory are known, including, for example, compression and anti-rollback.

When data is transferred between memories, inverse processing operations may be performed in relation to the source and destination memories. For example, data stored in a source memory in encrypted form may be decrypted after reading it from the source memory, and then the decrypted data may be re-encrypted before storing it in the destination memory.

SUMMARY OF THE DISCLOSURE

Systems, methods, computer-readable media, and other examples of transferring data between memories are disclosed herein.

An exemplary method for transferring data between memories may include reading data associated with a memory transfer transaction from a first memory. The exemplary method may also include determining whether a bypass indication associated with the memory transfer transaction is asserted. The exemplary method may further include transferring the data from the first memory to a second memory. The transferring may include bypassing first-processing the data if the bypass indication is asserted. The transferring may further include bypassing second-processing the data if the bypass indication is asserted. The exemplary method may still further include storing the data in the second memory.

An exemplary system for transferring data between memories may include a first memory, a second memory, and memory transfer control logic. The memory transfer control logic may include first processing logic and second processing logic. The memory transfer control logic may be configured to read data associated with a memory transfer transaction from the first memory. The memory transfer control logic may also be configured to determine whether a bypass indication associated with the memory transfer transaction is asserted. The memory transfer control logic may further be configured to bypass applying the first processing logic to the data if the bypass indication is asserted. The memory transfer control logic may still further be configured to bypass applying the second processing logic if the bypass indication is asserted. The memory transfer control logic may yet further be configured to store the data in the second memory.

Another exemplary system for transferring data between memories may include means for reading data associated with a memory transfer transaction from a first memory. The exemplary system may also include means for determining whether a bypass indication associated with the memory transfer transaction is asserted. The exemplary system may further include means for transferring the data from the first memory to a second memory. The means for transferring may include means for bypassing the first-processing if the bypass indication is asserted. The means for transferring may further include means for bypassing the second-processing if the bypass indication is asserted. The exemplary system may also include means for storing the data in the second memory.

An exemplary computer-readable medium for transferring data between memories may comprise a non-transitory computer-readable medium having instructions stored thereon in computer-executable form. The instructions, when executed by a processing system of the computing device, may configure the processing system to read data associated with a memory transfer transaction from a first memory. The instructions, when executed by the processing system, may also configure the processing system to determine whether a bypass indication associated with the memory transfer transaction is asserted. The instructions, when executed by the processing system, may further configure the processing system to bypass first-processing the data if the bypass indication is asserted. The instructions, when executed by the processing system, may still further configure the processing system to bypass second-processing the data if the bypass indication is asserted. The instructions, when executed by the processing system, may yet further configure the processing system to store the data in the second memory.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects. The term "coupled" may be used herein to mean connected via zero or more intervening elements, in contrast with the term "directly connected," which may be used herein to mean connected via no intervening elements.

Figure 1:
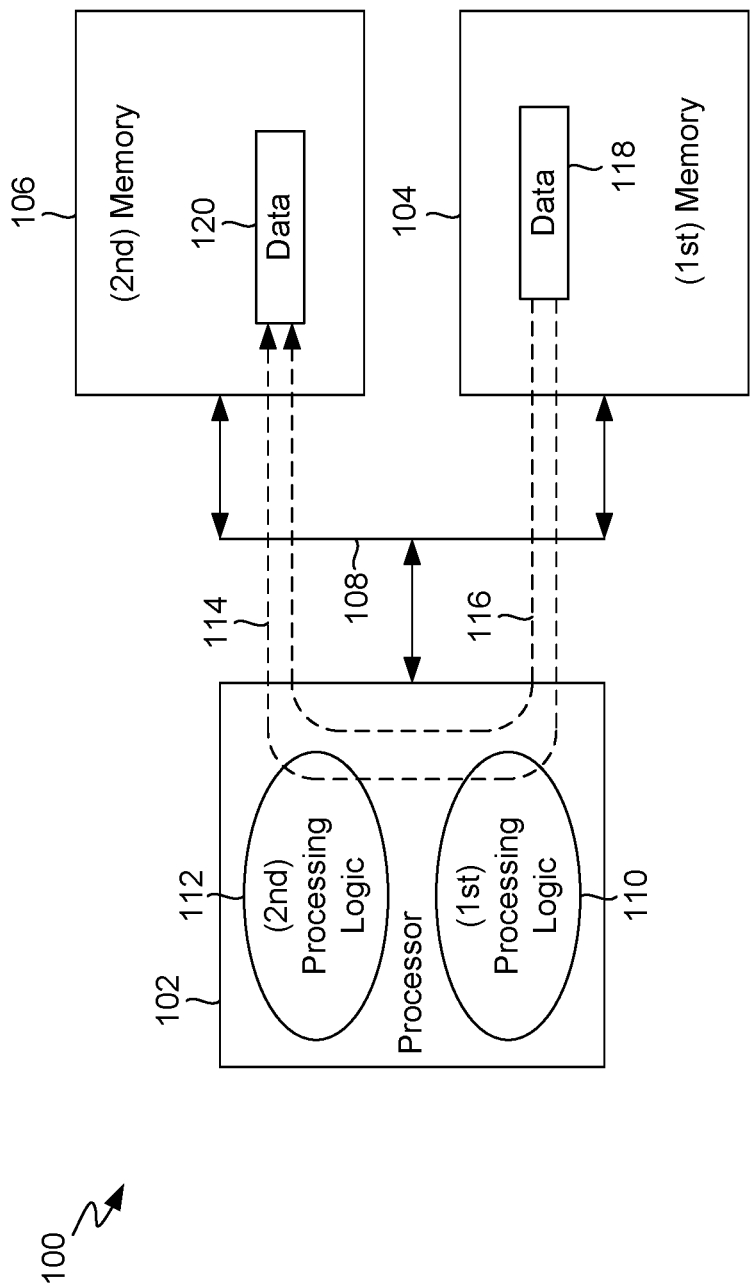
FIG. 1 is a block diagram illustrating a system for transferring data between memories, in accordance with exemplary embodiments.

As illustrated in FIG. 1, in an illustrative or exemplary embodiment, a computing device 100 may include at least one processor 102, and at least a first memory 104 and a second memory 106. Although not shown for purposes of clarity, the computing device 100 may also include other components, such as, for example, other memories, other processors, interfaces, power controllers, etc. The processor 102 and memories 104 and 106 may be interconnected by one or more buses or other data communication interconnects 108. The computing device 100 may be of any type. Likewise, the memories 104 and 106 may be of any type. The processor 102 may be, for example, a CPU, an NPU, a GPU, a DMA engine, etc., or any other type of processor, including the "accelerator" types described below. Although in the embodiment illustrated in FIG. 1 the processor 102 has a unitary form, in other embodiments such a processor may be in a distributed form, comprising two or more processors. Also, as described below, in some embodiments the memories 104 and 106 and the processor 102 may be on the same chip as each other, while in other embodiments one or more of these components may be on different chips from one or more others of these components. The first memory 104 and the second memory 106 each may comprise any number and type of physical data storage devices.

In the embodiment illustrated in FIG. 1, the processor 102 may be configured with first processing logic 110 and second processing logic 112. Nevertheless, in embodiments in which such a processor is distributed, such first and second processing logic may be distributed between two processors. The first processing logic 110 and second processing logic 112 may correspond to processor logic that is configured by the execution of corresponding software on the processor 102, in accordance with conventional computing principles. That is, the processor 102 may provide or embody the first processing logic 110 and second processing logic 112 by being configured by software in execution. For brevity, corresponding actions or functions that may occur under the control of the configured processor 102 may be referred to as being performed by the first processing logic 110 (e.g., a "first-processing" action or function) or the second processing logic 112 (e.g., a "second-processing" action or function).

The first processing logic 110 may, among other functions, control aspects of a memory transaction in which data is transferred between memories, such as from the first memory 104 to the second memory 106 or from the second memory 106 to the first memory 104. The second processing logic 112 similarly may, among other functions, control aspects of a memory transaction in which data is transferred between memories, such as from the first memory 104 to the second memory 106 or from the second memory 106 to the first memory 104. The memory transfer transaction may be initiated by the first processing logic 110, the second processing logic 112, or other logic.

The data that is the subject of a memory transfer transaction between the first and second memories 104 and 106 may be protected. Various types of data protection are known to one of ordinary skill in the art and are contemplated in the exemplary embodiments described herein. For example, data may be stored in the first memory 110 or second memory 112 in encrypted form prior to transferring the data. Alternatively, or in addition, data may be stored along with corresponding metadata in the first memory 104 or second memory 106 prior to transferring the data. An example of such metadata is parity (in error-correcting code ("ECC") examples, sometimes referred to as syndrome) metadata, which may protect the corresponding data against erroneous bit changes (i.e., data corruption). Another example of such metadata is a digest for hashing and authentication. Whether the processing generates additional metadata depends on the type of processing. For example, encryption-in-place processing may not generate additional metadata. As described below, metadata may be stored at another address different from the address at which the original data may be stored.

Although the first processing logic 110 and second processing logic 112 may perform various functions or operations, at least one such operation may be selectively enabled or performed (and conversely, selectively disabled or bypassed) in accordance with a feature described below. That is, the first processing logic 110 and second processing logic 112 may be selectively applied to the data to selectively first-process and second-process the data. Bypassing such processing logic or processing functions may reduce the amount of time required to transfer the data, save power, and provide other advantages.

A first-processing operation or function that the first processing logic 110, when enabled or applied to the data, may perform may be the inverse of a second-processing operation or function that the second processing logic 112, when enabled or applied to the data, may perform. In an example in which data is transferred from the first memory 104 to the second memory 106, the first processing logic 110 may decrypt data after the data is read from the first memory 104, and the second processing logic 112 may encrypt (i.e., re-encrypt) that data before the data is stored in the second memory 106. In FIG. 1, a broken-line arrow 114 conceptually indicates such a data transfer from the first memory 104 to the second memory 106, including decryption by the first processing logic 110 and re-encryption by the second processing logic 112. Alternatively, or in addition, in an example (not shown) in which data is transferred from the second memory 106 to the first memory 104, the second processing logic 112 may decrypt data after the data is read from the second memory 106, and the first processing logic 110 may re-encrypt that data before the data is stored in the first memory 104.

Whether the first-processing by the first processing logic 110 occurs or is bypassed, and whether the second-processing by the second processing logic 112 occurs or is bypassed, may be based on the state of a bypass indication associated with the memory transfer transaction. Thus, transferring the data from the first memory 104 to the second memory 106 may include the first processing logic 110 decrypting the data read from the first memory 104 if the bypass indication is not asserted, and bypassing decrypting the data read from the first memory 104 if the bypass indication is asserted. In such an example, transferring the data from the first memory 104 to the second memory 106 may also include the second processing logic 112 re-encrypting that data if the bypass indication is not asserted, and bypassing the re-encrypting if the bypass indication is asserted. Bypassing decrypting the data after the data is read from the first memory 104 and bypassing re-encrypting that data before it is stored in the second memory 106 thus preserves the data in its original (encrypted) form. In FIG. 1, another broken-line arrow 116 conceptually indicates a data transfer from the first memory 104 to the second memory 106 in which decryption by the first processing logic 110 is bypassed and re-encryption by the second processing logic 112 is bypassed.

As described below, bypassing decrypting data stored in encrypted form in the first memory 104 and re-encrypting the decrypted data before storing the re-encrypted data in the second memory 106 may occur when, for example, the encryption keys (not shown in FIG. 1) used to protect the data in the first and second memories 104 and 106, respectively, are identical to each other. Examples of ways to provide such identical keys are described below. There may be multiple keys, each associated with a memory region. For example, the first processing logic 110 may use a first key to protect data stored in a region 118 in the first memory 104, and the second processing logic 112 may use a second key identical to the first key to protect data stored in a region 120 in the second memory 106.

Figure 2:
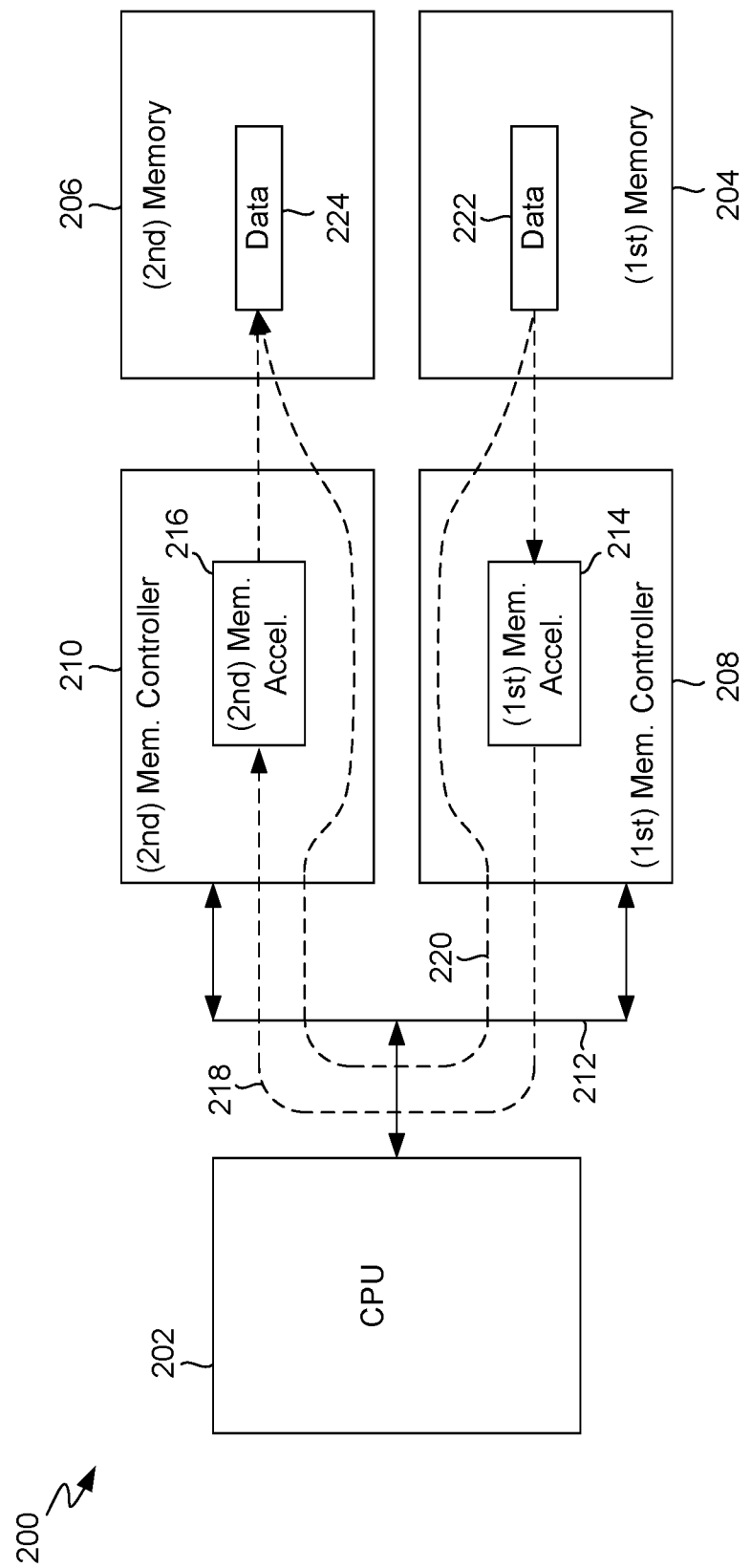
FIG. 2 is a block diagram illustrating another system for transferring data between memories, in accordance with exemplary embodiments.

As illustrated in FIG. 2, in another illustrative or exemplary embodiment, a computing device 200 may include a CPU 202, a first memory 204, a second memory 206, a first memory controller 208, and a second memory controller 210, interconnected by one or more buses or interconnects 212. The first and second memory controllers 208 and 210 are types of processors or processing systems. The first and second memory controllers 208 and 210 may control some aspects of memory transactions in a conventional manner. Memory controller functions that are conventional and therefore well understood by one or ordinary skill in the art are not described herein.

The first memory controller 208 may include a first memory accelerator 214. The second memory controller 210 may similarly include a second memory accelerator 216. The first and second memory accelerators 214 and 216 are types of processors or processing systems. In the illustrated embodiment, the first and second memory accelerators 214 and 216 may be included to offload some of the processing tasks or operations that may otherwise be performed by the CPU 202, such as operations described above with regard to first and second processing logic 110 and 112 (FIG. 1). For example, the first memory accelerator 214 may be configured to, among other functions, encrypt data before storing it in the first memory 204 and to decrypt data after reading it from the first memory 204. Likewise, the second memory accelerator 214 may be configured to, among other functions, encrypt data before storing it in the second memory 206 and to decrypt data after reading it from the second memory 206.

Encryption and decryption by the first and second memory accelerators 214 and 216 may be selectively performed and bypassed, based on the state of a bypass indication. In an example in which data is transferred from the first memory 204 to the second memory 206, transferring the data may include the first memory controller 208 providing the data read from the first memory 204 to the first memory accelerator 214 if the bypass indication is not asserted. In such an example, transferring the data may also include the first memory controller 208 bypassing or not providing the data read from the first memory 204 to the first memory accelerator 214 if the bypass indication is asserted. When the first memory controller 208 bypasses the first memory accelerator 214 while reading data from the first memory 204, the first memory accelerator 214 does not attempt to decrypt that data, and the first memory controller 208 passes the data in its original (encrypted) form to the second memory controller 210 via the interconnect 212. In such an example, transferring the data may further include the second memory controller 210 providing the data received (via the interconnect 212) from the first memory controller 208 to the second memory accelerator 216 if the bypass indication is not asserted. In such an example, transferring the data may further include the second memory controller 210 bypassing or not providing the received data to the second memory accelerator 216 if the bypass indication is asserted. When the second memory controller 210 bypasses the second memory accelerator 216 while storing data in the second memory 206, the second memory accelerator 216 does not attempt to encrypt that data, and the second memory controller 210 stores the data in the original (encrypted) form in which it was received. In FIG. 2, a broken-line arrow 218 conceptually indicates a data transfer from the first memory 204 to the second memory 206 in which the first and second memory accelerators 214 and 216 are not bypassed. Another a broken-line arrow 220 conceptually indicates a data transfer from the first memory 204 to the second memory 206 in which the first and second memory accelerators 214 and 216 are bypassed. In some examples, the CPU 202 may also play a role in transferring data between the memories 204 and 206, such as, for example, initiating the memory transfer transaction, determining when the transaction is complete, etc.

Keys may be used to protect encrypted data in the memories 204 and 206 in the manner described above with regard to the embodiment illustrated in FIG. 1. For example, the first memory controller 210 may use a first key to protect data stored in a region 222 in the first memory 204, and the second memory controller 212 may use a second key identical to the first key to protect data stored in a region 224 in the second memory 206.

Parity information or other metadata corresponding to data stored in the first memory 204 or second memory 206 may also be stored. Processing operations or functions relating to such metadata may be selectively performed and bypassed, based on the state of the bypass indication. For example, parity operations (e.g., parity information generation, error detection or correction, etc.) by the first and second memory accelerators 214 and 216 may be selectively performed and bypassed, based on the state of the bypass indication. In an example in which parity-protected data is transferred from the first memory 204 to the second memory 206, transferring the data may include the first memory controller 208 providing both the data read from the first memory 204 and the corresponding parity information (e.g., an error-correcting code or "ECC") read from the first memory 204 to the first memory accelerator 214 if the bypass indication is not asserted, thereby enabling or allowing the first memory accelerator 214 to perform an error-correcting operation on the data using the ECC. In such an example, transferring the data may also include the first memory controller 208 bypassing the first memory accelerator 214 if the bypass indication is asserted, thereby disabling or precluding the first memory accelerator 214 from performing an error-correcting operation on the data. When the first memory controller 208 bypasses the first memory accelerator 214 while reading parity-protected data from the first memory 204, the first memory accelerator 214 passes the data as well as the corresponding parity information in their original form to the second memory controller 210 via the interconnect 212. In such an example, transferring the data and metadata may further include the second memory controller 210 providing the data received from the first memory controller 210 to the second memory accelerator 216 if the bypass indication is not asserted, thereby enabling or allowing the second memory accelerator 216 to re-generate an ECC from the data. In such an example, transferring the data may still further include the second memory controller 210 bypassing or not providing the received data and ECC to the second memory accelerator 214 if the bypass indication is asserted, thereby disabling or precluding the second memory accelerator 216 from re-generating an ECC. When the second memory controller 210 bypasses the second memory accelerator 216 while storing ECC-protected data in the second memory 206, the second memory controller 210 stores the data and corresponding ECC in the original forms in which the second memory controller 210 received the data and corresponding ECC.

As the location of the ECC in the second memory 206 depends on the configuration at the second processing logic 112, the first processing logic 110 may not know the destination address for the ECC in the second memory 206. Therefore, the first processing logic 110 may use the base address of the original data at the second memory 206 as the destination address for the transaction carrying the ECC. As the second processing logic 112 receives the transaction (with the bypass indication, e.g., bus signal, asserted to indicate that this transaction carries the ECC and not the original data), the second processing logic 112 may use its pre-programmed configuration to calculate the destination address for the ECC based on the incoming transaction's address, which is the original data's address. The second processing logic 112 may then store the ECC in the calculated address in the second memory 206.

The above-described bypass indication may have any form. For example, the bypass indication may be a signal that a component generates when the component reads data from a memory using a page table (not shown). As understood by one of ordinary skill in the art, a page table is a data structure in which are stored mappings or translations between virtual and physical memory addresses, thereby enabling the component, such as a CPU, memory controller, accelerator, etc., to determine physical addresses that are the target of the memory transaction. One or more bits in a page table may be available to store what is sometimes referred to as hardware attribute information. The well-known Page-Based Hardware Attribute ("PBHA") is an example of hardware attribute information stored in a page table. When a page table is read, the PBHA, or signals derived therefrom, may be propagated through the memory system via buses as part of the memory transaction. In accordance with an aspect of the present disclosure, in some examples, any of the above-described memory controllers 208 or 210 (or their accelerators 214 or 216, respectively) may read a PBHA bit or other hardware attribute information associated with the data that is the subject of the memory transfer transaction.

In an example in which data is transferred from the first memory 204 to the second memory 206 (FIG. 2), transferring the data may include the first memory controller 208 reading the page table to determine not only the address in the first memory 204 at which the data is located but also the hardware attribute information associated with that address (or memory region containing that address). The hardware attribute information may have, for example, a value of "1" to indicate enabling the first-processing and second-processing, and a value of "0" to indicate bypassing the first-processing and the second-processing. Accordingly, in an example in which data is transferred from the first memory 204 to the second memory 206 (FIG. 2), the hardware attribute information may have a value of "1" to indicate enabling error checking (e.g., error correcting) by the first memory accelerator 214 and enabling parity generation by the second memory accelerator 216, and a value of "0" to indicate bypassing error checking by the first memory accelerator 214 and bypassing parity generation by the second memory accelerator 216. In an example in which the first memory controller 208 reads this hardware attribute information from a page table as part of a memory transaction in which the first memory controller 208 reads data from the first memory 204, the hardware attribute information may be propagated on the interconnect 212 along with the data as part of the read transaction.

In this example, the hardware attribute information indicates to the memory controllers 208 and 210 whether to bypass the accelerators 214 and 216 (or alternatively, indicates directly to the accelerators 214 and 216 whether to perform parity operations or bypass parity operations). Nevertheless, in other examples such hardware attribute information may similarly indicate to such components whether to perform decryption and re-encryption or bypass decryption and re-encryption, whether to perform decompression and re-compression or bypass decompression and re-compression, etc.

Figure 3:
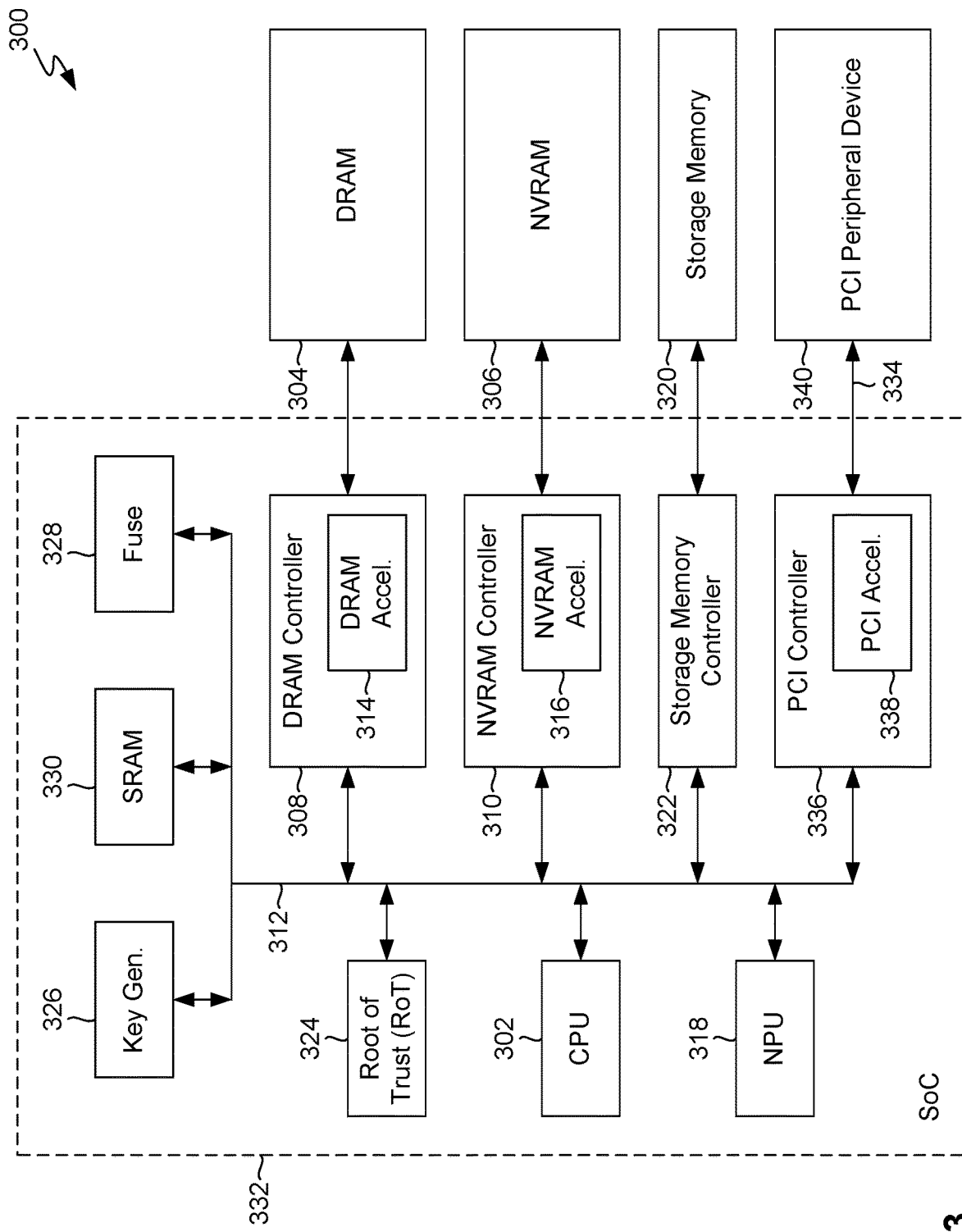
FIG. 3 is a block diagram illustrating still another system for transferring data between memories, in accordance with exemplary embodiments.

As illustrated in FIG. 3, various embodiments may include components in addition to those described above. A device 300, which may be an example of the above-described device 100 (FIG. 1) or 200 (FIG. 2), may include such additional components. For example, the device 300 may include a CPU 302, a dynamic random access memory ("DRAM") 304, a non-volatile random access memory ("NVRAM") 306, a DRAM controller 308, and an NVRAM controller 310, interconnected by one or more buses or interconnects 312. The DRAM 304 may comprise, for example, double data-rate synchronous DRAM ("DDR-SDRAM"). The NVRAM 306 may comprise, for example, flash memory. The DRAM controller 308 may include a DRAM accelerator 314. Similarly, the NVRAM controller 310 may include an NVRAM accelerator 316. The foregoing elements of the device 300 may be similar to above-described elements of the devices 100 or 200. For example, the DRAM 304 and NVRAM 306 may be examples of first and second memories 204 and 206, respectively.

In addition to the foregoing elements, the device 300 may include, for example, other processors, such as an NPU 318, and additional types of memory, such as a storage memory 320. A storage memory controller 322 may be coupled to the storage memory 320. The device 300 may also include a root of trust ("RoT") 324, a key generator 326, and a programmable fuse 328, which may function in a manner described below. The device 300 may include other elements, such as static ("SRAM") RAM 330. In some examples of operation, data being transferred between memories in the manner described above with regard to FIGS. 1-2 may be temporarily stored in the static RAM 330, or temporarily stored or buffered elsewhere, without departing from the scope of that description.

The CPU 302, memory controllers 308, 310 and 322, NPU 318, RoT 324, key generator 326, fuse 328, and SRAM 330 may be contained on a system-on-a-chip ("SoC") 332. The SoC 332 may be coupled to other components of the device 300 via, for example, a Peripheral Component Interconnect ("PCI") bus 334 or other inter-system bus. Accordingly, the SoC 332 may include a PCI controller 336. The PCI controller 336 may include a PCI accelerator 338, which may operate in a manner described below. A PCI peripheral 340 may be configured to communicate with the SoC 332 via the PCI bus 334 and PCI controller 336.

Figure 4:
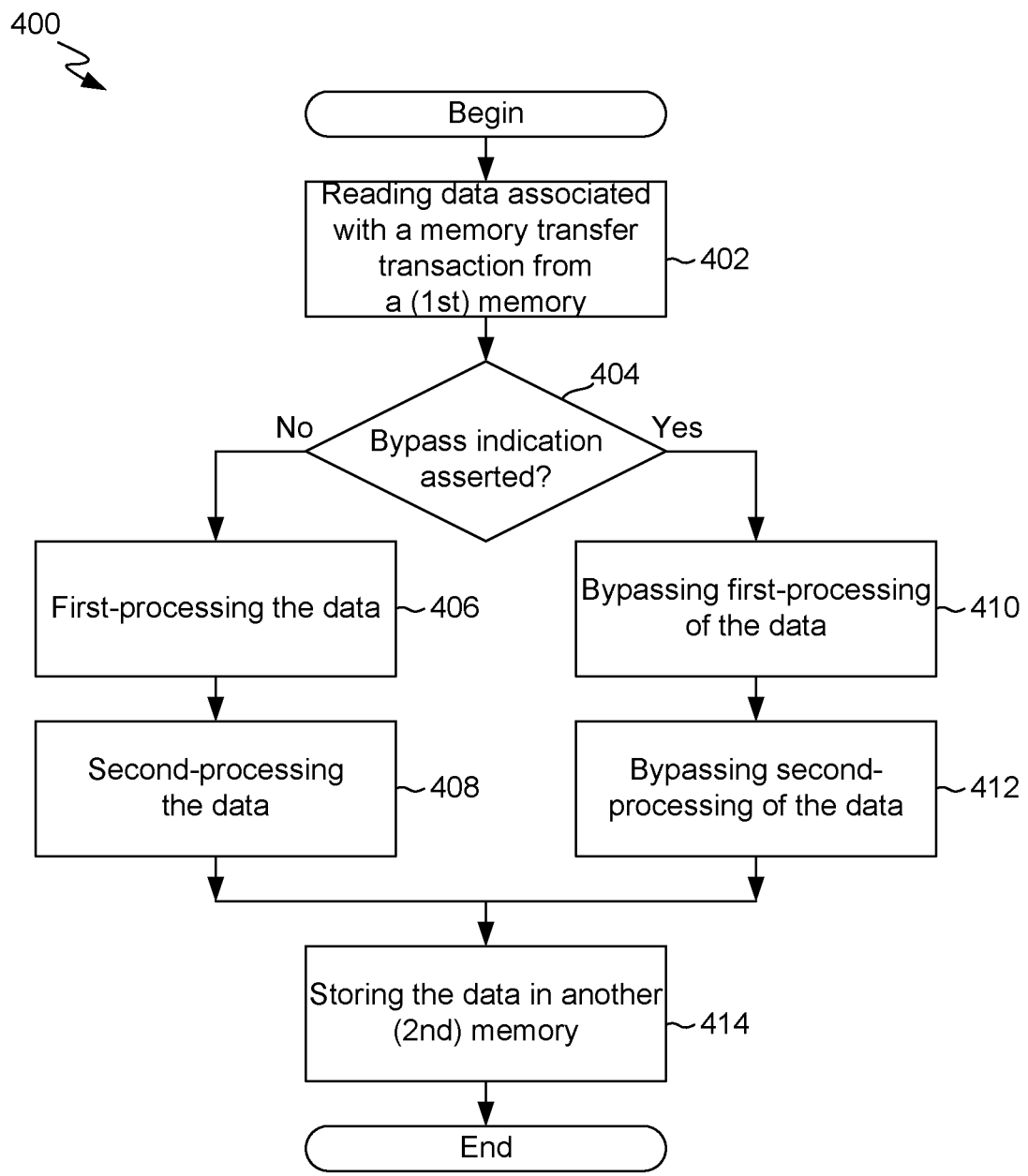
FIG. 4 is a flow diagram illustrating a method for transferring data between memories, in accordance with exemplary embodiments.

In FIG. 4, an exemplary method 400 for transferring data from one ("first") memory to another ("second") memory may be performed in any of the above-described devices 100 (FIG. 1), 200 (FIG. 2) or 300 (FIG. 3) or any other device not inconsistent with the following description. In the following description of the method 400, the terms "first memory" and "second memory" may broadly include any two memories or other data storage devices between which data may be transferred via a data bus or similar interconnect. The first and second memories each may comprise any number and type of physical storage devices.

As indicated by block 402, the method 400 may include reading the data from the first memory. As indicated by block 404, the method 400 may include determining if a bypass indication is asserted. As indicated by blocks 406 and 408, respectively, the method 400 may include first-processing and second-processing the data if the bypass indication is not asserted. For example, first-processing may comprise at least one of decrypting, parity checking, and decompressing, while second-processing may comprise at least one of re-encrypting, re-generating parity, and re-compressing, respectively. As indicated by blocks 410 and 412, respectively, the method 400 may include bypassing first-processing and second-processing the data if the bypass indication is asserted. As indicated by block 414, the method 400 may include storing the data in the second memory either following the processing (blocks 406 and 408) if the bypass indication is not asserted or following the bypassing (blocks 410 and 412) if the bypass indication is asserted.

Also, note that in an example in which metadata corresponding to the data is also stored (whether in the same memory as the data or in a different memory), the metadata may similarly be transferred to another memory in accordance with the method 400. That is, transferring data from a first memory to a second memory in the manner described above may also include transferring any associated metadata from a first memory to a second memory in a similar manner.

Figure 5:
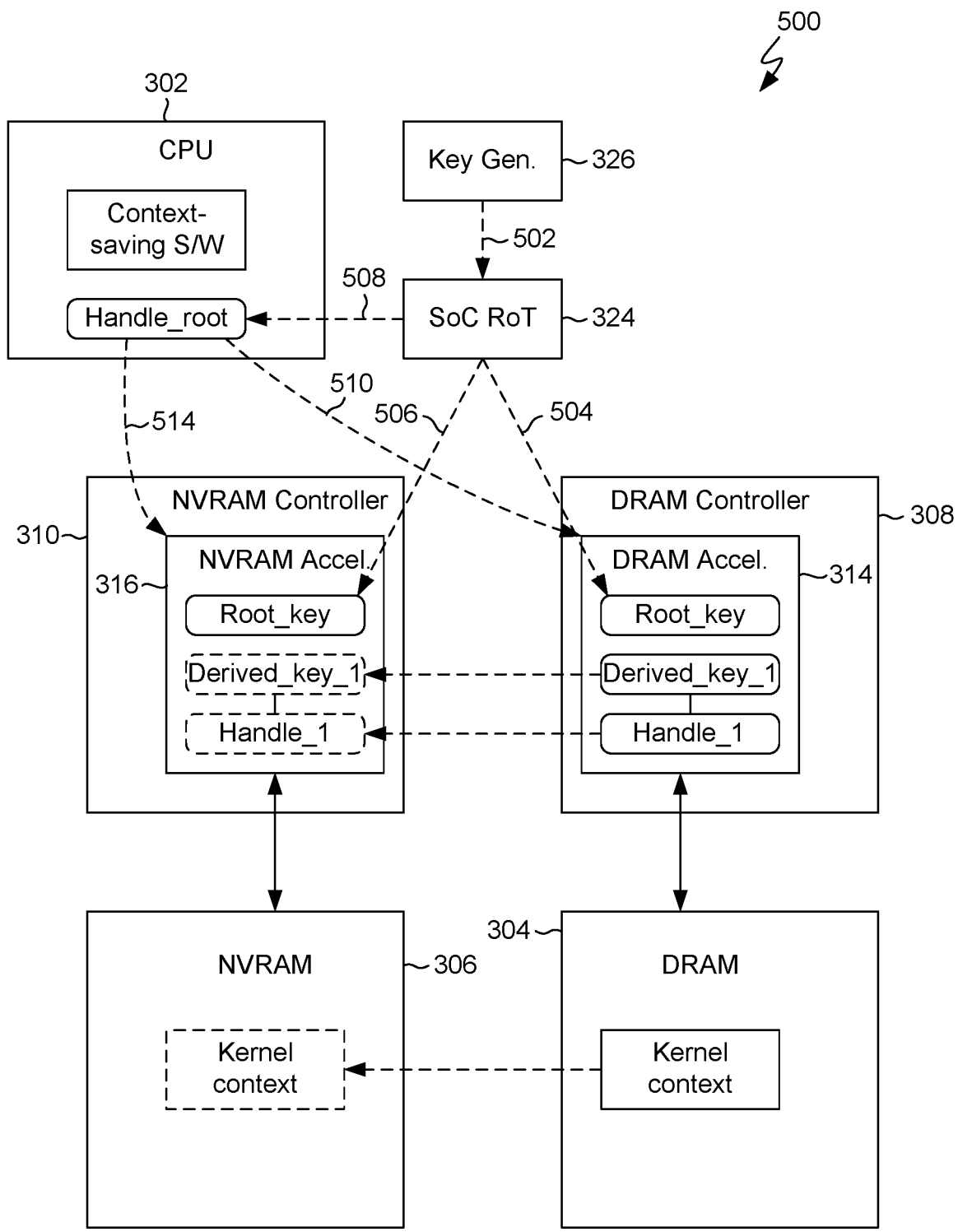
FIG. 5 is a functional block diagram illustrating a sequence of actions for controlling the transfer of data between memories, in accordance with exemplary embodiments.

In FIG. 5, an exemplary control path or sequence of actions for configuring a system for transferring data between memories is illustrated using a functional block diagram 500. The example illustrated in FIG. 5 relates to a use case or operational scenario in which a device, such as the above-described device 300 (FIG. 3), transitions from an active mode to a hibernation mode. In transitioning from an active mode to the hibernation mode, data such as operating system kernel context data may be transferred from the DRAM 304 to the NVRAM 306. As such a hibernation mode is well understood by one of ordinary skill in the art, aspects not directly relating to transferring data between memories are not described in further detail herein.

The operating system kernel context data may be stored in encrypted form in the DRAM 304 while the device is in the active mode and similarly may be stored in encrypted form in the NVRAM 306 while the device is in the hibernation mode. In the following example, encryption keys are generated and used to enable access to the kernel context data both before and after the kernel context data is transferred.

As indicated by the arrow 502, the key generator 326 may generate one or more hardware keys. As such a hardware key may not be visible to the software, the key generator 326 may provide the software with a handles to the hardware keys. For example, using information securely encoded by the fuse 328 (FIG. 3) the key generator 326 may generate a root key ("Root_key"), which may be a type of public key. The RoT 324 may receive the handle to the root key from the key generator 326. As indicated by the arrow 508, the RoT 324 may provide a handle ("Handle_root") to the root key to the CPU 302 (e.g., to the operating system kernel). As indicated by the arrows 510 and 514, the CPU 302 (e.g., operating system kernel) may pass the handle to the DRAM controller 308 and NVRAM controller 310, so that the DRAM accelerator 314 and the NVRAM accelerator 316 may use the handle to get the hardware key without exposing the value of the key to the software. As indicated by the arrows 504 and 506, respectively, the RoT 324 may provide this same root key to both the DRAM accelerator 314 and the NVRAM accelerator 316. The RoT 324 also provides key derivation method information to both the both the DRAM accelerator 314 and the NVRAM accelerator 316 that the DRAM accelerator 314 and the NVRAM accelerator 316 each may use to derive one or more private keys from the root key. As the RoT 324 may provide the same key derivation method information to both the DRAM accelerator 314 and the NVRAM accelerator 316, the DRAM accelerator 314 and the NVRAM accelerator may derive identical private keys each time they derive a private key.

In some examples of operation, the DRAM accelerator 314 and the NVRAM accelerator 316 each may derive only one private key because the kernel context data occupies only one region (or "buffer") in the DRAM 304 and only one region in the NVRAM 306. In other examples of operation, the DRAM accelerator 314 and the NVRAM accelerator 316 each may derive more than one private key because the kernel context data occupies more than one region in the DRAM 304 and more than one region in the NVRAM 306. In the example illustrated in FIG. 5, the DRAM accelerator 314 and the NVRAM accelerator 316 each may derive one key ("Derived_key_1") identical to the key the other derives.

The kernel context data stored in the DRAM 304 is protected by the derived key. The DRAM controller 308 and DRAM accelerator 314 do not allow any entity, such as, for example, the CPU 302, to access the kernel context data stored in the DRAM 304 unless the entity accesses the DRAM 304 using a handle to the derived key ("Handle_1") or a handle to the root key ("Handle_root").

The CPU 302 may determine whether to switch from the active mode to the hibernation mode in a conventional manner. The software under which the CPU 302 operates may include context-saving software. When the CPU 302 determines to transition from the active mode to the hibernation mode, the CPU 302, under the control of the context-saving software, may initiate transferring the kernel context data from the DRAM 304 to the NVRAM 306. The CPU 302 may cause the bypass indication to be asserted in the manner described above, such as reading page table attribute information associated with the memory region in which the kernel context data is stored. As a result, the kernel context data is transferred out of the DRAM 304 without the DRAM accelerator 314 decrypting it, and transferred into the NVRAM 306 without the NVRAM accelerator 316 re-encrypting it. Alternatively to the CPU 302 controlling the aspect of the data transfer that causes the bypass indication to be asserted, any other processing engine, such as the DRAM controller 308, the DRAM accelerator 314, the NVRAM controller 310, the NVRAM accelerator 316, a DMA engine (not shown), etc., may control that aspect of the data transfer, as described above with regard to other examples.

In this example, transferring data from the DRAM 304 to the NVRAM 306 may include not only the CPU 302 controlling the transfer of the kernel context data from the DRAM 304 to the NVRAM 306 but also controlling the transfer of the derived key ("Derived_key_1") and its handle ("Handle_1") from the DRAM accelerator 314 to the NVRAM accelerator 316. After the derived key and its handle are transferred to the NVRAM accelerator 316, the kernel context data stored in the NVRAM 306 is protected by the derived key in the same manner in which the kernel context data was protected while it was stored in the DRAM 304. That is, the NVRAM controller 310 and NVRAM accelerator 316 do not allow any entity, such as, for example, the CPU 302, to access the kernel context data stored in the NVRAM 306 unless the entity accesses the NVRAM 306 using a handle to the derived key ("Handle_1") or a handle to the root key ("Handle_root").

The device may transition from the hibernation mode back to the active mode. In such an example, the kernel context data may be transferred from the NVRAM 306 back to the DRAM 304. Operations similar to those described above with regard to transferring the kernel context data from the DRAM 304 to the NVRAM 306 may be performed in transferring the kernel context data from the NVRAM 306 to the DRAM 304.

Figure 6:
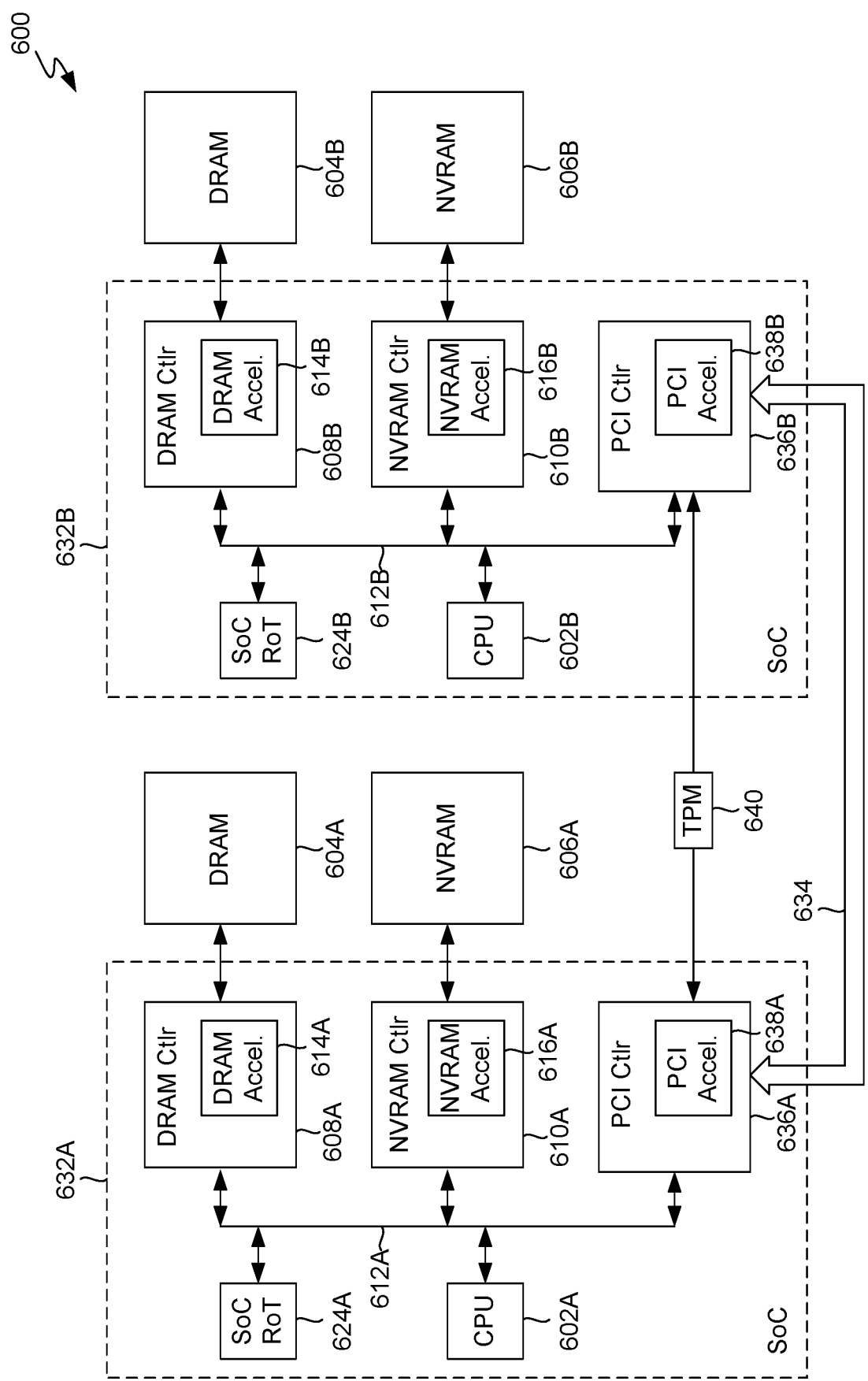
FIG. 6 is a block diagram illustrating yet another system for transferring data between memories, in accordance with exemplary embodiments.

As illustrated in FIG. 6, in an exemplary embodiment transferring data between memories may include transferring data (and keys) via a secure inter-system data bus, such as, for example, a PCI bus 634. Although the following description relates to an exemplary embodiment in which the secure inter-system data bus conforms to a PCI specification, in other embodiments such an inter-system data bus may be of any type that features bus controllers configured to encrypt and decrypt data at the bus endpoints. The PCI bus 634 may be coupled between a first system, such as a first SoC 632A, and a second system, such as a second SoC 632B. The first SoC 632A, second SoC 632B, and the PCI bus 634 may be included in a device 600. One of the first and second SoCs 632A and 632B may be an example of the SoC 332 described above with regard to FIG. 3, and the other may be an example of the PCI peripheral device 340 (FIG. 3).

The first SoC 632A may include a CPU 602A, a DRAM controller 608A, and an NVRAM controller 610A, interconnected by one or more buses or interconnects 612A. The DRAM controller 608A and NVRAM controller 610A may be coupled to a DRAM 604A and an NVRAM 606A, respectively. The DRAM controller 608A and the NVRAM controller 610A may include a DRAM accelerator 614A and an NVRAM accelerator 616A, respectively. The first SoC 632A may also include an RoT 624A. The first SoC 632A may further include a PCI controller 636A coupled to a first endpoint of the PCI bus 634. The PCI controller 636A may include a PCI accelerator 638A. Although not shown for purposes of clarity, the first SoC 632A may also include other elements similar to those described above with regard to the SoC 332 (FIG. 3), such as a key generator, programmable fuse, other memories, memory controllers, processors, etc.

Similarly, the second SoC 632B may include a CPU 602B, a DRAM controller 608B, and an NVRAM controller 610B, interconnected by one or more buses or interconnects 612B. The DRAM controller 608B and the NVRAM controller 610B may be coupled to a DRAM 604B and an NVRAM 606B, respectively. The DRAM controller 608B and the NVRAM controller 610B may include a DRAM accelerator 614B and an NVRAM accelerator 616B, respectively. The second SoC 632B may also include an RoT 624B. The second SoC 632B may further include a PCI controller 636B coupled to a second endpoint of the PCI bus 634. The PCI controller 636B may include a PCI accelerator 638B. Although not shown for purposes of clarity, the second SoC 632B may also include other elements similar to those described above with regard to the SoC 332 (FIG. 3), such as a key generator, programmable fuse, other memories, memory controllers, processors, etc.

In the following description of an example of transferring data between memories, aspects of operation of the SoCs 332A and 332B that are similar to those described above with regard to the SoC 332 (FIG. 3) may be omitted for brevity. For example, the RoTs 624A and 624B may provide encryption keys in the manner described above. In an example in which data is to be transferred from the DRAM 604A to the DRAM 604B, identical keys may be provided to the DRAM accelerator 614A and the DRAM accelerator 614B.

Other encryption keys may be provided to the PCI controllers 636A and 636B by, for example, a Trusted Platform Module ("TPM") 640. The keys provided to the PCI controllers 636A and 636B may be identical to each other. The TPM 640 may conform to a standard known as ISO/IEC 11889.

The PCI protocol conventionally includes a secure data transfer feature. A sending PCI controller can be selectively enabled to encrypt data before transmitting the data over the PCI bus, as understood by one of ordinary skill in the art. If the sending PCI controller encrypts the data, the PCI protocol notifies the receiving PCI controller that the data packets are encrypted, and the receiving PCI controller decrypts those data packets accordingly. If the sending PCI controller does not encrypt the data, the PCI protocol notifies the receiving PCI controller that the data packets are not encrypted, and the receiving PCI controller does not attempt to decrypt those data packets.

In the exemplary embodiment illustrated in FIG. 6, the PCI controllers 638A and 638B further may be configured to detect the above-described bypass indication. In the same manner described above with regard to other embodiments, a memory read transaction may result in propagating the bypass indication on the interconnect 612A along with the data. The PCI accelerator 638A may detect whether the bypass indication is asserted. Leveraging the above-described PCI secure data transfer feature by which a sending PCI controller can be selectively enabled to encrypt data before transmitting the data over the PCI bus, the PCI accelerator 638A may be configured to bypass encrypting the data if the bypass indication is asserted.

Before data is transferred via the PCI bus 634, the DRAM accelerator 614A may transfer the key protecting that data. The PCI secure data transfer feature may be utilized to transfer the key via the PCI bus 634. In an example in which data is to be transferred from the DRAM 604A (in which the data resides in encrypted form) to the DRAM 604B, the DRAM accelerator 614A may provide the key used to protect the stored data to the PCI controller 636A in a manner that does not cause the bypass indication to be asserted. The PCI controller 636A therefore encrypts the key before sending the key over the PCI bus 634 to the PCI controller 636B. The PCI controller 636B then decrypts the key before providing the key to the DRAM accelerator 614B.

In an example in which data is to be transferred from the DRAM 604A to the DRAM 604B, the PCI controller 636A may read the data from the DRAM 604A (via the DRAM memory controller 608A) and transfer the data via the PCI bus 634. Note that such a memory transaction may be initiated not only by the DRAM accelerator 614A in this example but also (in other examples) by any of the other above-described processors, such as the CPU 602A, the NVRAM accelerator 616A, or the PCI controller 636A (or its PCI accelerator 638A). As part of such a memory transaction, the bypass indication may become asserted in the manner described above with regard to other embodiments. If the bypass indication is asserted, not only do the DRAM memory controllers 608A and 608B bypass encryption and decryption, but also the PCI controller 636A does not encrypt the data before the PCI controller 636A sends the data over the PCI bus 634 to the PCI controller 636B. As in other examples described above, the data is not re-encrypted before it is transferred (in this example, over the PCI bus 634) because the data resides in encrypted form in the memory from which the data is read, and the data is to continue to reside in the same encrypted form in the memory to which the data is transferred.

The PCI controller 636A may be configured to include the bypass indication as part of the transferred data packet payload. The PCI controller 636B may be configured to extract the bypass indication from the payload. The PCI controller 636B may be configured to provide the bypass indication along with the received data to the DRAM accelerator 614B. In this example, the DRAM accelerator 614B may detect that the bypass indication is asserted and therefore not attempt to decrypt the data before storing the data in the DRAM 604B.

Figure 7:
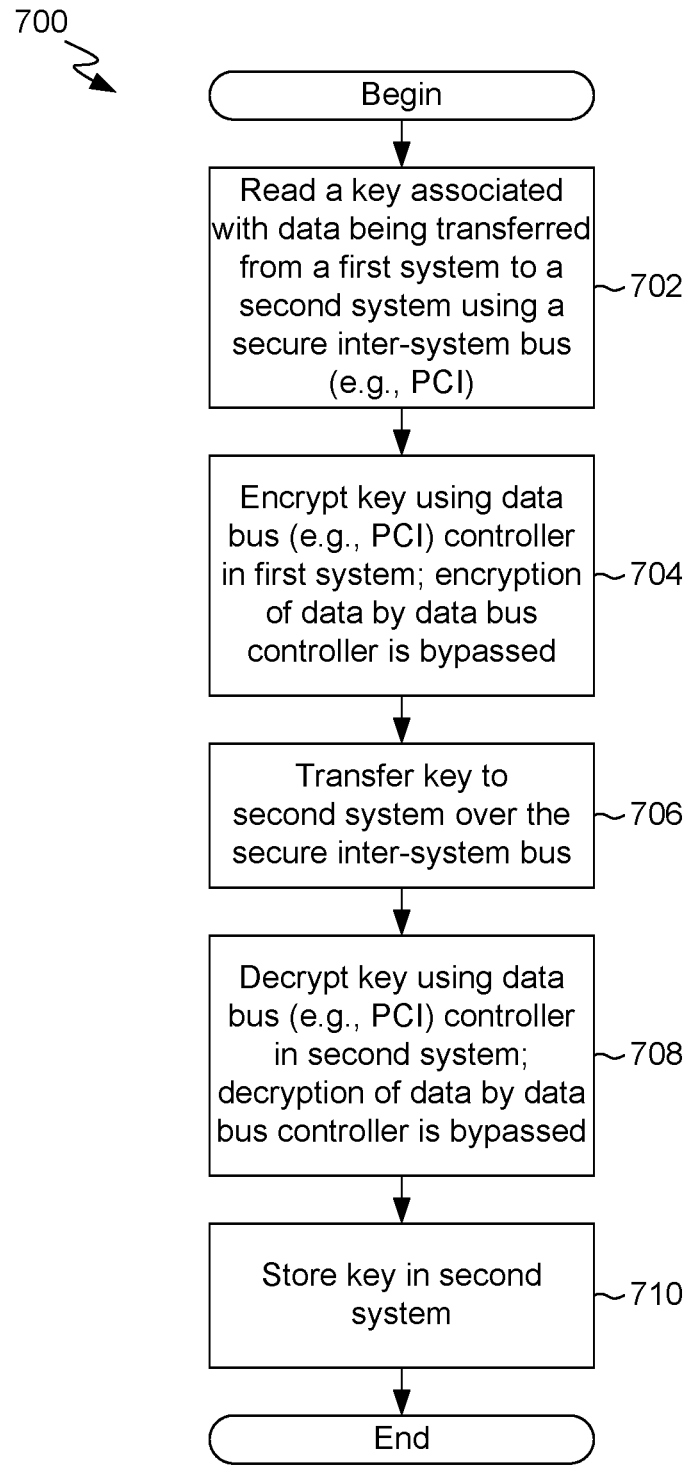
FIG. 7 is a flow diagram illustrating a method for transferring a key between memories, in accordance with exemplary embodiments.

In FIG. 7, a method 700 for transferring a key as part of a method for transferring data from a first system to a second system using a secure inter-system bus (e.g., PCI) is illustrated. As described above with regard to other embodiments, the data may reside in encrypted form in a memory in the first system. As indicated by block 702, the method 700 may include reading a key associated with the data being transferred. As indicated by block 704, the method 700 may further include encrypting the key using a data bus (e.g., PCI) controller in the first system. As indicated by block 706, the data bus controller may then send the key (in encrypted form) to the second system over the inter-system bus. A data bus (e.g., PCI) controller in the second system may receive and decrypt the key, as indicated by block 708. The data bus controller in the second system may then provide the key to a memory controller, memory accelerator, or other processor that protects the data when the data is stored in a memory in the second system. As indicated by block 710, that processor may store the key and otherwise use the key to protect the stored data.

As described above with regard to other embodiments, the data bus controller in the first system may bypass encrypting the data protected by the above-referenced key when the data bus controller sends the data over the data bus. Similarly, the data bus controller in the second system may bypass decrypting the data when it receives the data over the data bus. In the second system, the data bus controller, memory controller, memory accelerator, or other processor may store the received data in a memory in the second system. The data thus resides in the memory in the second system in the same encrypted form in which it resided in the memory in the first system.

Figure 8:
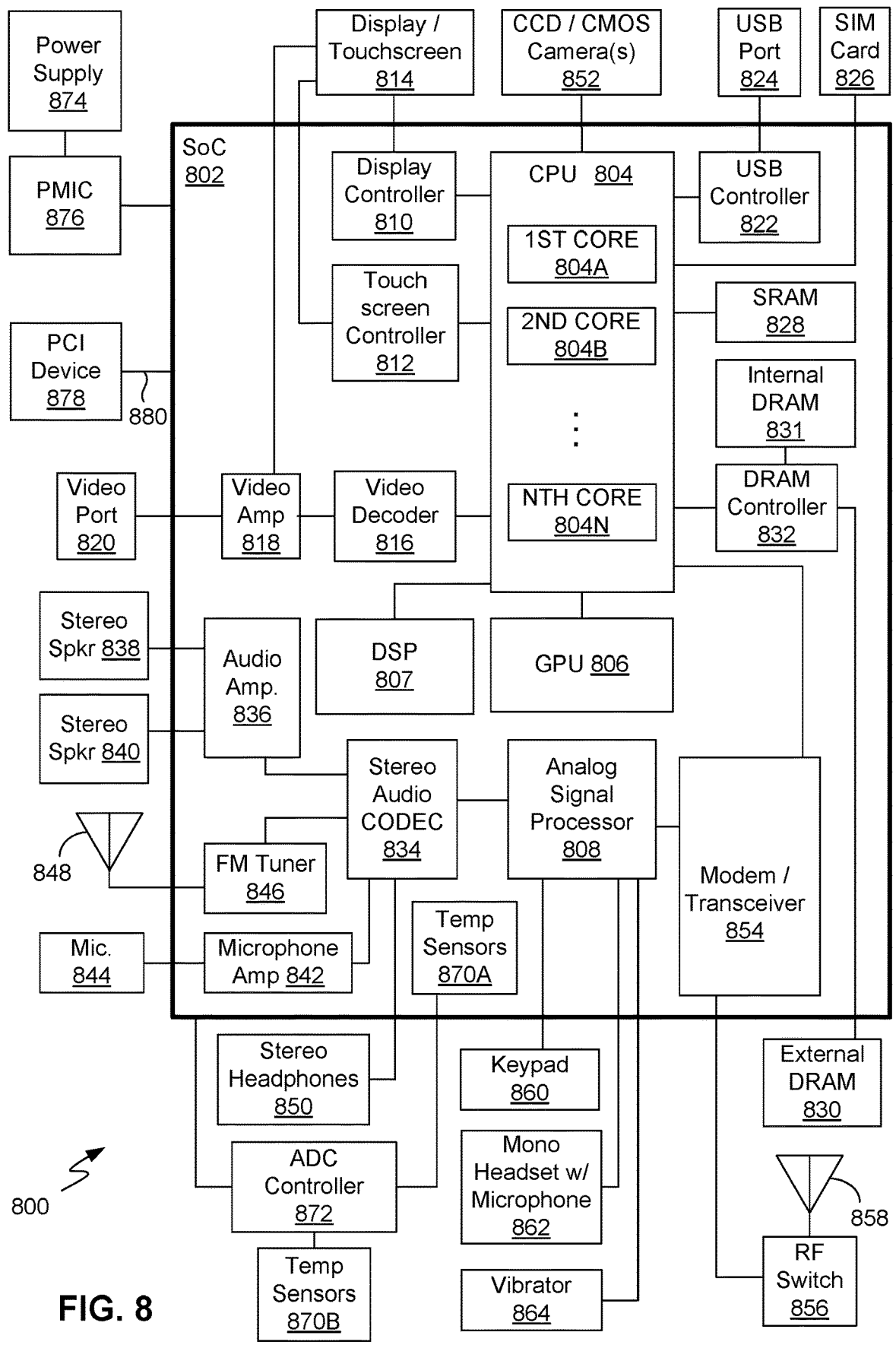
FIG. 8 is a block diagram of a portable computing device, in accordance with exemplary embodiments.

As illustrated in FIG. 8, exemplary embodiments of systems and methods for transferring data between memories may be provided in a portable computing device ("PCD") 800. The PCD 800 may be an example of any of the above-described devices 100 (FIG. 1), 200 (FIG. 2), 300 (FIG. 3), 600 (FIG. 6), etc. It should be noted that the interconnections among the components of the PCD 800 are shown in a conceptual manner in FIG. 8 and are not intended to represent data buses or other physical data interconnects. Rather, the various processors and memories of the PCD 800 may be interconnected in a manner similar to that described above with regard to FIGS. 1-3 and 6.

The PCD 800 may include an SoC 802. The SoC 802 may include a CPU 804, a GPU 806, a DSP 807, an analog signal processor 808, or other processors. The CPU 804 may include multiple cores, such as a first core 804A, a second core 804B, etc., through an Nth core 804N. In some examples of the SoC 802, the CPU 804 may be referred to as an application processor.

A display controller 810 and a touch-screen controller 812 may be coupled to the CPU 804. A touchscreen display 814 external to the SoC 802 may be coupled to the display controller 810 and the touch-screen controller 812. The PCD 800 may further include a video decoder 816 coupled to the CPU 804. A video amplifier 818 may be coupled to the video decoder 816 and the touchscreen display 814. A video port 820 may be coupled to the video amplifier 818. A universal serial bus ("USB") controller 822 may also be coupled to CPU 804, and a USB port 824 may be coupled to the USB controller 822. A subscriber identity module ("SIM") card 826 may also be coupled to the CPU 804.

One or more memories may be coupled to the CPU 804. The one or more memories may include both volatile and non-volatile memories. Examples of volatile memories include static random access memory ("SRAM") 828 and dynamic RAMs ("DRAM"s) 830 and 831. Such memories may be external to the SoC 802, such as the DRAM 830, or internal to the SoC 802, such as the DRAM 831. A DRAM controller 832 coupled to the CPU 804 may control the writing of data to, and reading of data from, the DRAMs 830 and 831. In other embodiments, such a DRAM controller may be included within a processor, such as the CPU 804.

A stereo audio CODEC 834 may be coupled to the analog signal processor 808. Further, an audio amplifier 836 may be coupled to the stereo audio CODEC 834. First and second stereo speakers 838 and 840, respectively, may be coupled to the audio amplifier 836. In addition, a microphone amplifier 842 may be coupled to the stereo audio CODEC 834, and a microphone 844 may be coupled to the microphone amplifier 842. A frequency modulation ("FM") radio tuner 846 may be coupled to the stereo audio CODEC 834. An FM antenna 848 may be coupled to the FM radio tuner 846. Further, stereo headphones 850 may be coupled to the stereo audio CODEC 834. Other devices that may be coupled to the CPU 804 include one or more digital (e.g., CCD or CMOS)

cameras 852. In addition, a keypad 860, a mono headset with a microphone 862, and a vibrator device 864 may be coupled to the analog signal processor 808.

A radio frequency (RF) transceiver or modem 854 may be coupled to the analog signal processor 808 and CPU 804. An RF switch 856 may be coupled to the modem 854 and an RF antenna 858. Although in the illustrated embodiment the modem 854 is included within the same SoC 802 having the CPU 804 and various other processors, in other embodiments such a modem may be external to such an SoC, e.g., a separate chip, and may itself be referred to as a type of SoC.

The SoC 802 may have one or more internal or on-chip thermal sensors 870A and may be coupled to one or more external or off-chip thermal sensors 870B. An analog-to-digital converter ("ADC") controller 872 may convert voltage drops produced by the thermal sensors 870A and 870B to digital signals. A power supply 874 and a Power Management Integrated Circuit ("PMIC") 876 may supply power to the SoC 802.

Although buses or other data interconnects internal to the SoC 802 are not shown for purposes of clarity, the SoC 802 may be coupled to a PCI peripheral device 878 via a PCI bus 880. Examples of the PCI peripheral device 878 may include camera data buffers, graphics data buffers, or other peripheral devices having memories.

Firmware or software may be stored in any of the above-described memories, such as DRAM 830 or 831, SRAM 828, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Transferring data between memories in accordance with the present disclosure may be embodied in any of the exemplary systems, methods, computer-readable media, etc., described above. Alternative embodiments will become apparent to one of ordinary skill in the art to which the invention pertains. Therefore, although selected aspects have been illustrated and described in detail, it will be understood that various substitutions and alterations may be made therein.

Implementation examples are described in the following numbered clauses:

1. A method for transferring data between memories, comprising:
reading data associated with a memory transfer transaction from a first memory;
determining whether a bypass indication associated with the memory transfer transaction is asserted;
transferring the data from the first memory to a second memory, the transferring including bypassing first-processing the data if the bypass indication is asserted, the transferring further including bypassing second-processing the data if the bypass indication is asserted; and storing the data in the second memory.

2. The method of claim 1, wherein transferring the data from the first memory to the second memory further comprises first-processing data read from the first memory if the bypass indication is not asserted and second-processing data resulting from the first-processing if the bypass indication is not asserted.

3. The method of clause 2, wherein the second-processing comprises an inverse operation of the first-processing.

4. The method of clause 3, wherein:
first-processing comprises at least one of decrypting, parity checking, and decompressing; and
second-processing comprises at least one of encrypting, generating parity, and compressing.

5. The method of clause 3, wherein:
reading the data comprises reading the data from a first memory region;
first-processing the data read from the first memory comprises decrypting data read from the first memory region;
second-processing comprises re-encrypting data resulting from the decrypting;
storing the data comprises storing the data resulting from the decrypting in a second memory region; and
the bypass indication indicates an encryption key is common to the first memory region and the second memory region.

6. The method of clause 5, further comprising producing the bypass indication based on page table attribute information associated with the first memory region.

7. The method of clause 2, further comprising:
reading metadata associated with the data from the first memory;
transferring the metadata from the first memory to the second memory, wherein first-processing the data read from the first memory includes using the metadata if the bypass indication is not asserted, and bypassing the first-processing comprises preserving the metadata if the bypass indication is asserted; and
storing preserved metadata in the second memory.

8. The method of clause 1, further comprising:
reading a key associated with the data;
encrypting the key using a first data bus controller coupled to a data bus;
transferring an encrypted key from the first memory to the second memory using the first data bus controller and the data bus;
decrypting the encrypted key using a second data bus controller coupled to the data bus; and
storing a decrypted key in the second memory in association with the data.

9. The method of clause 8, wherein the data bus is a Peripheral Component Interconnect (PCI) bus.

10. A system for transferring data between memories, comprising:
a first memory;
a second memory; and
memory transfer control logic including first processing logic and second processing logic, the memory transfer control logic configured to:
read data associated with a memory transfer transaction from the first memory;
determine whether a bypass indication associated with the memory transfer transaction is asserted;
bypass applying the first processing logic to the data if the bypass indication is asserted;
bypass applying the second processing logic to an output of the first processing logic if the bypass indication is asserted; and
store the data in the second memory.

11. The system of claim 10, wherein the memory transfer control logic is further configured to:
apply the first processing logic to the data read from the first memory if the bypass indication is not asserted; and apply the second processing logic to an output of the first processing logic if the bypass indication is not asserted.

12. The system of clause 11, wherein the first processing logic and the second processing logic are configured to perform inverse operations.

13. The system of clause 12, wherein:
the first processing logic is configured to perform at least one of decrypting, parity checking, and decompressing; and
the second processing logic is configured to perform at least one of encrypting, generating parity, and compressing.

14. The system of clause 12, wherein:
the first processing logic is configured to read the data from a first memory region and decrypt the data;
the second processing logic is configured to re-encrypt data decrypted by the first processing logic and store data re-encrypted by the second processing logic in a second memory region; and
the bypass indication indicates an encryption key is common to the first memory region and the second memory region.

15. The system of clause 14, wherein the memory transfer control logic is configured to produce the bypass indication based on page table attribute information associated with the first memory region.

16. The system of clause 10, wherein the memory transfer control logic is further configured to:
read metadata associated with the data from the first memory;
apply the first processing logic to the data read from the first memory by using the metadata if the bypass indication is not asserted;
bypass applying the first processing logic to preserve the metadata if the bypass indication is asserted; and
store preserved metadata in the second memory.

17. The system of clause 10, wherein the memory transfer control logic comprises:
a first data bus controller in a first system, the first system including the first memory, the first data bus controller configured to:
read a key associated with the data;
encrypt the key; and
transfer an encrypted key on a data bus; and
a second data bus controller in a second system coupled to the first system by the data bus, the second system including the second memory, the second data bus controller configured to:
receive an encrypted key on the data bus;
decrypt the encrypted key; and
store a decrypted key in the second memory in association with the data.

18. The method of clause 17, wherein the data bus is a Peripheral Component Interconnect (PCI) bus.

19. The system of clause 10, wherein:
the first processing logic is associated with the first memory and is configured to:
read the data from the first memory;
determine whether the bypass indication is asserted;
process data read from the first memory if the bypass indication is not asserted; and
bypass processing the data read from the first memory if the bypass indication is asserted; and
the second processing logic is associated with the second memory and is configured to:
determine whether the bypass indication is asserted;
process data output by the first processing logic if the bypass indication is not asserted;
bypass processing the data read from the first memory if the bypass indication is asserted;
store data output by the second processing logic in the second memory if the bypass indication is not asserted; and
store the data read from the first memory in the second memory if the bypass indication is asserted.

20. The system of clause 19, wherein:
the first processing logic comprises a first memory accelerator; and
the first processing logic comprises a second memory accelerator.

21. A system for transferring data between memories, comprising:
means for reading data associated with a memory transfer transaction from a first memory;
means for determining whether a bypass indication associated with the memory transfer transaction is asserted;
means for transferring the data from the first memory to a second memory, the means for transferring including means for bypassing first-processing the data if the bypass indication is asserted, the means for transferring further including means for bypassing second-processing the data if the bypass indication is asserted; and
means for storing the data in the second memory.

22. The system of claim 21, wherein the means for transferring further comprises:
means for first-processing the data if the bypass indication is not asserted; and
means for second-processing a result of the means for first-processing if the bypass indication is not asserted.

23. The system of clause 21, wherein the means for second-processing comprises an inverse of the means for first-processing.

24. The system of clause 23, wherein:
the means for first-processing comprises at least one of means for decrypting, means for parity checking, and means for decompressing; and
the means for second-processing comprises at least one of means for encrypting, means for generating parity, and means for compressing.

25. The method of clause 23, wherein:
the means for first-processing comprises means for decrypting;
the means for second-processing comprises means for re-encrypting;
the means for reading the data comprises means for reading the data from a first memory region;
the means for storing the data comprises means for storing the data in a second memory region; and
the bypass indication indicates an encryption key is common to the first memory region and the second memory region.

26. The system of clause 25, further comprising means for producing the bypass indication based on page table attribute information associated with the first memory region.

27. The system of clause 21, wherein:
the means for reading data is further for reading metadata associated with the data from the first memory;
the means for transferring the data is further for transferring the metadata from the first memory to the second memory, wherein the means for first-processing the data includes means for using the metadata if the bypass indication is not asserted and means for preserving the metadata if the bypass indication is asserted; and
the means for storing the data is further for storing preserved metadata in the second memory.

28. The system of clause 21, further comprising:

means for reading a key associated with the data;
means for encrypting the key using a first data bus controller coupled to a data bus;
means for transferring an encrypted key from the first memory to the second memory;
means for decrypting the encrypted key using a second data bus controller coupled to the data bus; and
means for storing a decrypted key in the second memory in association with the data.

29. A computer-readable medium for transferring data between memories, the computer-readable medium comprising a non-transitory computer-readable medium having stored thereon in computer-executable form instructions that when executed by a processing system of the computing device configure the processing system to:
read data associated with a memory transfer transaction from the first memory;
determine whether a bypass indication associated with the memory transfer transaction is asserted;
bypass first-processing the data if the bypass indication is asserted;
bypass second-processing the data if the bypass indication is asserted; and
store the data in the second memory.

30. The computer-readable medium of claim 29, wherein the instructions further configure the processing system to:
first-process the data if the bypass indication is not asserted; and
second-process a result of first-processing the data if the bypass indication is not asserted.

31. The computer-readable medium of clause 30, wherein:
the instructions configure the processing system to first-process the data by configuring the processing system to perform at least one of decrypting, parity checking, and decompressing; and
the instructions configure the processing system to second-process a result of first-processing the data by configuring the processing system to perform at least one of encrypting, generating parity, and compressing.

32. The computer-readable medium of clause 30, wherein the instructions further configure the processing system to produce the bypass indication based on page table attribute information.

33. The computer-readable medium of clause 30, wherein the instructions further configure the processing system to:
read metadata associated with the data from the first memory;
transfer the metadata from the first memory to the second memory, wherein the instructions configure the processing system to first-process the data using the metadata if the bypass indication is not asserted and configure the processing system to bypass first-processing the data to preserve the metadata if the bypass indication is asserted; and
store preserved metadata in the second memory.

34. The computer-readable medium of clause 30, wherein the instructions further configure the processing system to:
read a key associated with the data if the bypass indication is asserted;
encrypt the key using a first data bus controller coupled to a data bus;
transfer an encrypted key from the first memory to the second memory using the first data bus controller and the data bus;
decrypt the encrypted key using a second data bus controller coupled to the data bus; and
store a decrypted key in the second memory in association with the data.

What is claimed is:

1. A method for transferring data between memories, comprising:
generating a handle to a root key and key derivation information with a root of trust module;
sending the handle with the root of trust module to a processor;
the processor providing the handle to a first accelerator of a first memory and to a second accelerator of a second memory, the first memory comprising dynamic random access memory, the second memory comprising non-volatile random access memory;
sending the root key and key derivation information with the root of trust module to the first accelerator and the second accelerator;
the first and second accelerators deriving private keys based on the handle and root key for encrypting data in the first and second memories;
the processor reading data associated with a memory transfer transaction from the first memory;
the processor producing a bypass indication based on attribute information of a page table from the read data associated with the memory transaction from the first memory;
determining whether the bypass indication associated with the memory transfer transaction is asserted;
transferring the data from the first memory to a second memory, the transferring including bypassing first-processing the data if the bypass indication is asserted, the transferring further including bypassing second-processing the data if the bypass indication is asserted, both the bypassing first-processing the data and the bypassing second-processing the data avoid use of the private keys by the first and second accelerators; and
storing the data in the second memory.

2. The method of claim 1, wherein transferring the data from the first memory to the second memory further comprises first-processing data read from the first memory if the bypass indication is not asserted and second-processing data resulting from the first-processing if the bypass indication is not asserted.

3. The method of claim 2, wherein the second-processing comprises an inverse operation of the first-processing.

4. The method of claim 3, wherein:
first-processing comprises at least one of decrypting, parity checking, and decompressing; and
second-processing comprises at least one of encrypting, generating parity, and compressing.

5. The method of claim 3, wherein:
reading the data comprises reading the data from a first memory region;
first-processing the data read from the first memory comprises decrypting data read from the first memory region using one of the private keys;
second-processing comprises re-encrypting data resulting from the decrypting using one of the private keys;
storing the data comprises storing the data resulting from the decrypting in a second memory region; and
the bypass indication indicates at least one private key is common to the first memory region and the second memory region.

6. The method of claim 5, wherein the bypass indication is associated with the first memory region.

7. The method of claim 1, wherein the first memory stores encrypted kernel context data.

8. The method of claim 1, further comprising: the processor determining to transition from an active mode to a hibernation mode.

9. A system for transferring data between memories, comprising:
a root of trust module generating a handle to a root key and key derivation information and sending the handle with the root of trust module to a processor;
the processor providing the handle to a first accelerator of a first memory and to a second accelerator of a second memory, the first memory comprising dynamic random access memory, the second memory comprising non-volatile random access memory;
the root of trust module sending the root key and key derivation information to the first accelerator and the second accelerator;
the first and second accelerators deriving private keys based on the handle and root key for encrypting data in the first and second memories; and
memory transfer control logic including first processing logic and second processing logic and the processor, the memory transfer control logic configured to:
have the processor read data associated with a memory transfer transaction from the first memory, the processor producing a bypass indication based on attribute information of a page table from the read data associated with the memory transaction from the first memory;
determine whether the bypass indication associated with the memory transfer transaction is asserted;
bypass applying the first processing logic to the data if the bypass indication is asserted;
bypass applying the second processing logic to an output of the first processing logic if the bypass indication is asserted, both the bypassing applying the first processing logic and bypassing applying the second processing logic avoid use of the private keys by the first and second accelerators; and
store the data in the second memory.

10. The system of claim 9, wherein the memory transfer control logic is further configured to:
apply the first processing logic to the data read from the first memory if the bypass indication is not asserted; and
apply the second processing logic to an output of the first processing logic if the bypass indication is not asserted.

11. The system of claim 10, wherein the first processing logic and the second processing logic are configured to perform inverse operations.

12. The system of claim 11, wherein:
the first processing logic is configured to perform at least one of decrypting, parity checking, and decompressing; and
the second processing logic is configured to perform at least one of encrypting, generating parity, and compressing.

13. The system of claim 11, wherein:
the first processing logic is configured to read the data from a first memory region and decrypt the data using one of the private keys;
the second processing logic is configured to re-encrypt data decrypted by the first processing logic using one of the private keys and store data re-encrypted by the second processing logic in a second memory region; and the bypass indication indicates at least one private key is common to the first memory region and the second memory region.

14. The system of claim 13, wherein the bypass indication is associated with the first memory region.

15. The system of claim 9, wherein
the first memory stores encrypted kernel context data.

16. The system of claim 9, wherein the processor determines whether to transition from an active mode to a hibernation mode.

17. The system of claim 9, wherein:
the first processing logic comprises the first memory accelerator; and
the second processing logic comprises the second memory accelerator.

18. A system for transferring data between memories, comprising:
a root of trust module generating a handle to a root key and key derivation information and sending the handle with the root of trust module to a processor;
the processor providing the handle to a first accelerator of a first memory and to a second accelerator of a second memory, the first memory comprising dynamic random access memory, the second memory comprising non-volatile random access memory;
the root of trust module sending the root key and key derivation information to the first accelerator and the second accelerator;
the first and second accelerators deriving private keys based on the handle and root key for encrypting data in the first and second memories;
means for reading data associated with a memory transfer transaction from a first memory;
a processor for producing a bypass indication based on a page based hardware attribute of a page table from the read data associated with the memory transaction from the first memory;
means for determining whether the bypass indication associated with the memory transfer transaction is asserted;
means for transferring the data from the first memory to a second memory, the means for transferring including means for bypassing first-processing the data if the bypass indication is asserted, the means for transferring further including means for bypassing second-processing the data if the bypass indication is asserted, both the means for bypassing first-processing the data and the means for bypassing second-processing the data avoid use of the private keys by the first and second accelerators; and
means for storing the data in the second memory.

19. The system of claim 18, wherein the means for transferring further comprises:
means for first-processing the data if the bypass indication is not asserted; and
means for second-processing a result of the means for first-processing if the bypass indication is not asserted.

20. The system of claim 18, wherein the means for second-processing comprises an inverse of the means for first-processing.

21. The system of claim 20, wherein:
the means for first-processing comprises at least one of means for decrypting, means for parity checking, and means for decompressing; and
the means for second-processing comprises at least one of means for encrypting, means for generating parity, and means for compressing.

22. The system of claim 20, wherein:
the means for first-processing comprises means for decrypting using one of the private keys;
the means for second-processing comprises means for re-encrypting using one of the private keys;
the means for reading the data comprises means for reading the data from a first memory region;
the means for storing the data comprises means for storing the data in a second memory region; and
the bypass indication indicates at least one private key is common to the first memory region and the second memory region.

23. The system of claim 22, wherein the bypass indication is associated with the first memory region.

24. The system of claim 18, wherein
the first memory stores encrypted kernel context data.

25. A computer-readable medium for transferring data between memories, the computer-readable medium comprising a non-transitory computer-readable medium having stored thereon in computer-executable form instructions that when executed by a processing system of the computing device configure the processing system to:
generating a handle to a root key and key derivation information with a root of trust module;
sending the handle with the root of trust module to a processor;
the processor providing the handle to a first accelerator of a first memory and to a second accelerator of a second memory, the first memory comprising dynamic random access memory, the second memory comprising non-volatile random access memory;
sending the root key and key derivation information with the root of trust module to the first accelerator and the second accelerator;
the first and second accelerators deriving private keys based on the handle and root key for encrypting data in the first and second memories;
read data with a processor associated with a memory transfer transaction from the first memory;
the processor producing a bypass indication based on attribute information of a page table from the read data associated with the memory transaction from the first memory;
determine whether the bypass indication associated with the memory transfer transaction is asserted;
bypass first-processing the data if the bypass indication is asserted;
bypass second-processing the data if the bypass indication is asserted, both the bypassing first-processing the data and the bypassing second-processing the data avoid use of the private keys by the first and second accelerators; and
store the data in the second memory.

26. The computer-readable medium of claim 25, wherein the instructions further configure the processing system to:
first-process the data if the bypass indication is not asserted; and
second-process a result of first-processing the data if the bypass indication is not asserted.

27. The computer-readable medium of claim 26, wherein;
the instructions configure the processing system to first-process the data by configuring the processing system to perform at least one of decrypting, parity checking, and decompressing; and
the instructions configure the processing system to second-process a result of first-processing the data by configuring the processing system to perform at least one of encrypting, generating parity, and compressing.

28. The computer-readable medium of claim 26, wherein first memory stores encrypted kernel context data.

29. The computer-readable medium of claim 25, wherein the processor determines to transition from an active mode to a hibernation mode.

* * * * *